United States Patent [19]

Niemann et al.

[11] Patent Number: 4,997,007
[45] Date of Patent: Mar. 5, 1991

[54] SHOWER DIVERTER VALVE

[75] Inventors: James E. Niemann, Noblesville; Patrick B. Jonte, Indianapolis, both of Ind.

[73] Assignee: Masco Corporation of Indiana, Taylor, Mich.

[21] Appl. No.: 467,087

[22] Filed: Jan. 18, 1990

[51] Int. Cl.⁵ ............................................ F16K 11/085
[52] U.S. Cl. .................. 137/625.47; 137/597; 137/876
[58] Field of Search ............... 137/597, 625.47, 876; 251/316, 317, 311

[56] References Cited

U.S. PATENT DOCUMENTS

| 434,094 | 8/1890 | Schwachheim | 251/311 X |
|---|---|---|---|
| 1,203,395 | 10/1916 | Palmer | 251/311 |
| 1,249,837 | 12/1917 | Scheer | |
| 1,580,501 | 4/1926 | Lambert | 251/311 X |
| 2,420,785 | 5/1947 | Lorraine | 137/625.47 |
| 2,902,253 | 9/1959 | Page | 251/311 |
| 2,906,293 | 9/1959 | Fraser et al. | 137/597 |
| 3,296,026 | 1/1967 | Long | 251/317 X |
| 3,489,389 | 1/1970 | Kaatz | 251/317 X |
| 3,684,242 | 8/1972 | Hauffe et al. | 251/317 |
| 3,709,256 | 1/1973 | Gore et al. | 137/625.47 |
| 3,974,869 | 8/1976 | Abe et al. | |
| 4,003,403 | 1/1977 | Nehring | |
| 4,146,055 | 3/1979 | Ryder et al. | |
| 4,523,604 | 6/1985 | Hutto | 137/107 |

Primary Examiner—Stephen M. Hepperle
Attorney, Agent, or Firm—Myron B. Kapustij; Edgar A. Zarins; Malcolm L. Sutherland

[57] ABSTRACT

A diverter valve assembly having a machined brass housing that seats a diverter valve that has a stem portion, inlet portion and outlet portion. The outlet portion is tubular and has an arcuate sealing pad secured thereon by axial flanges and keys on the outlet section. The sealing pad is flexible and the tubular outlet portion is resiliently flexible to allow an interference fit in a cylindrical bore in the brass housing.

15 Claims, 3 Drawing Sheets

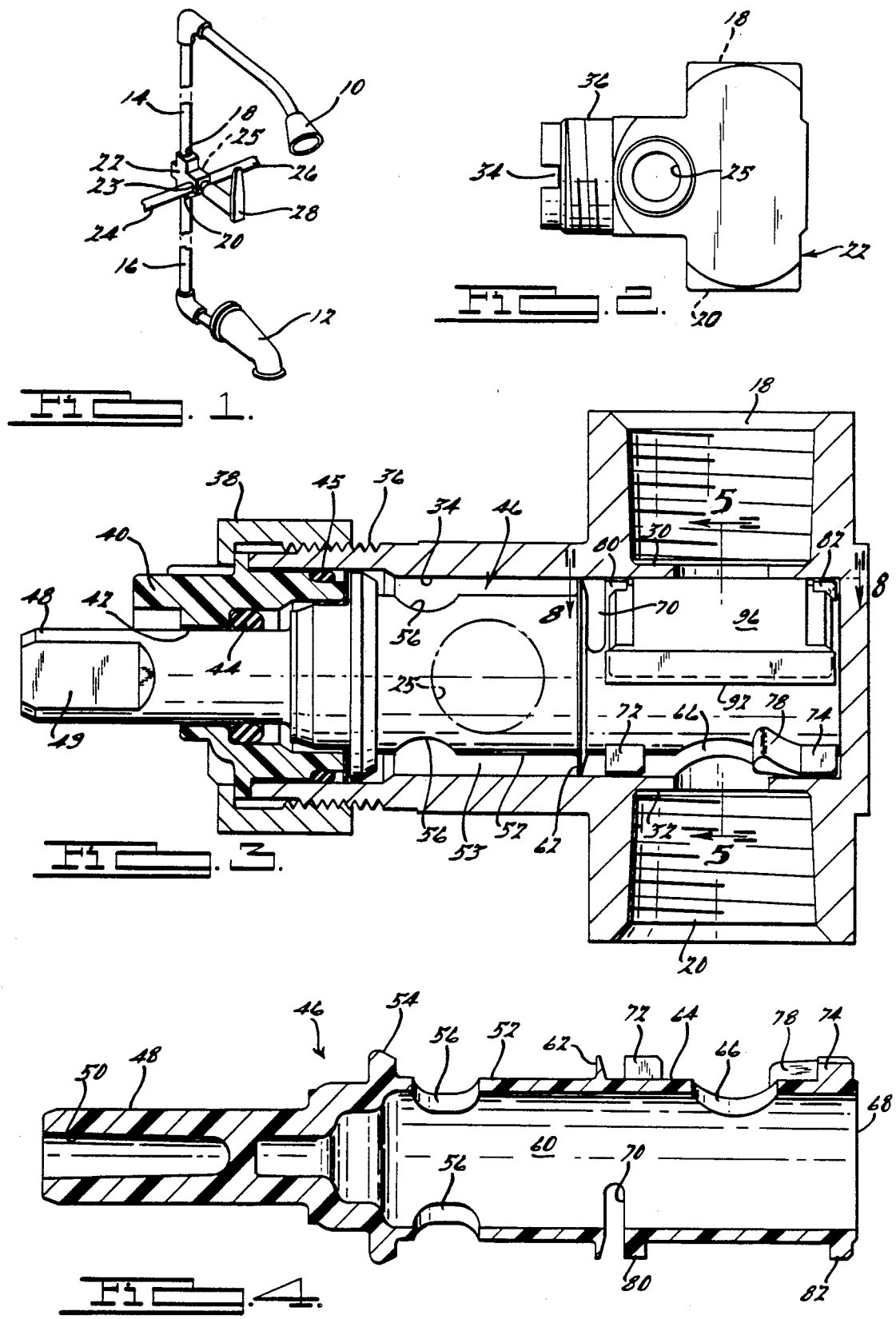

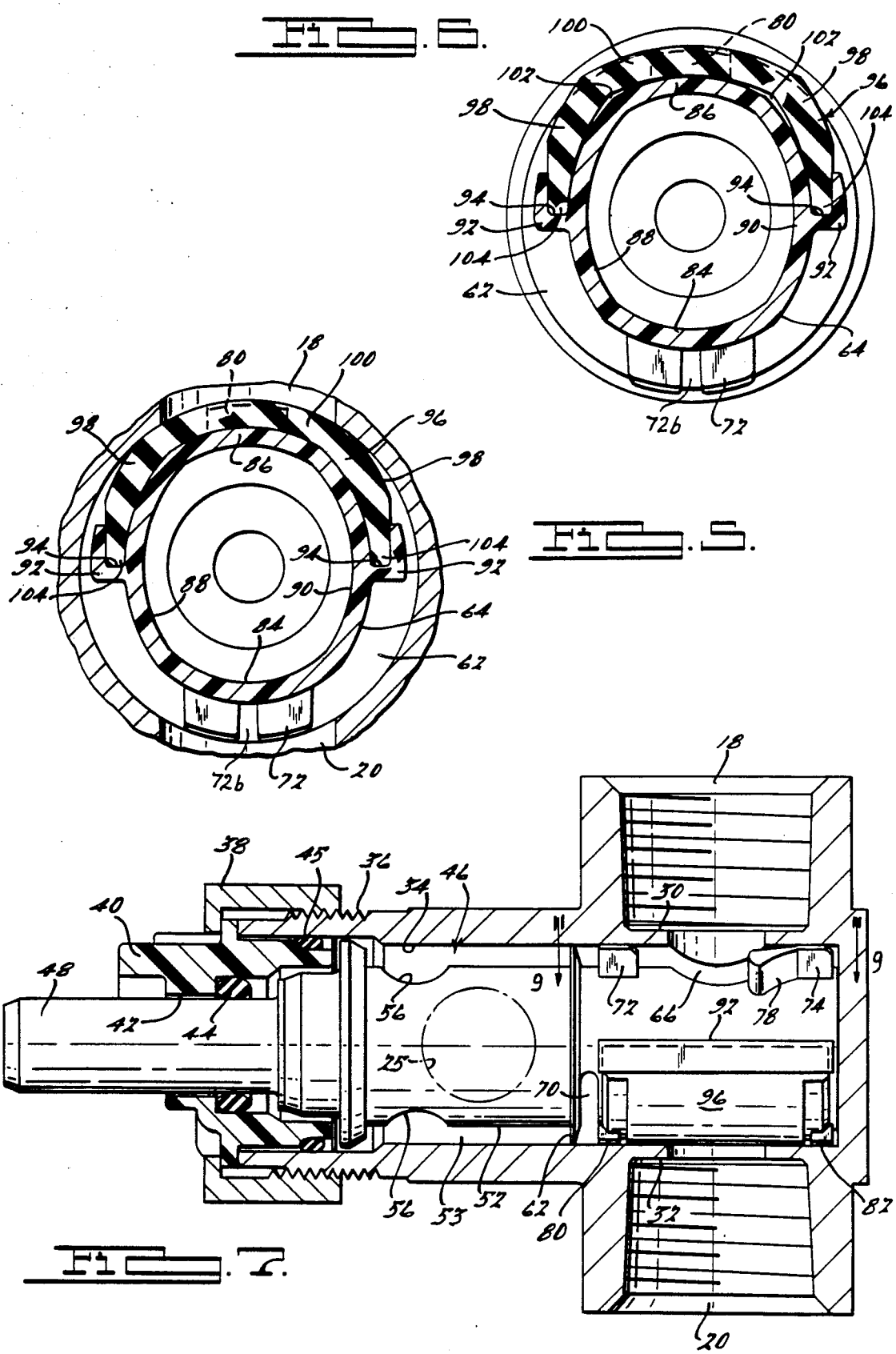

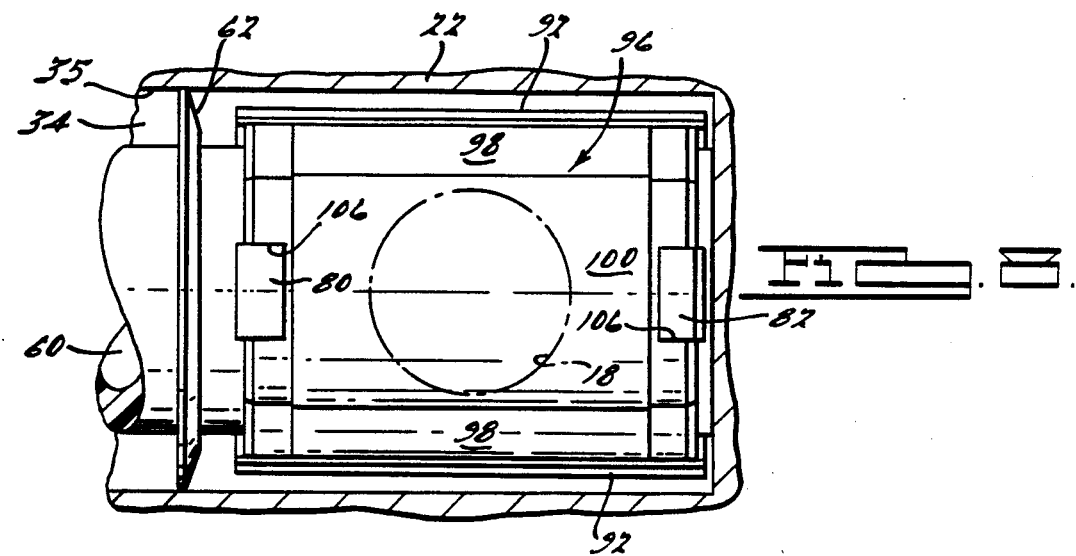
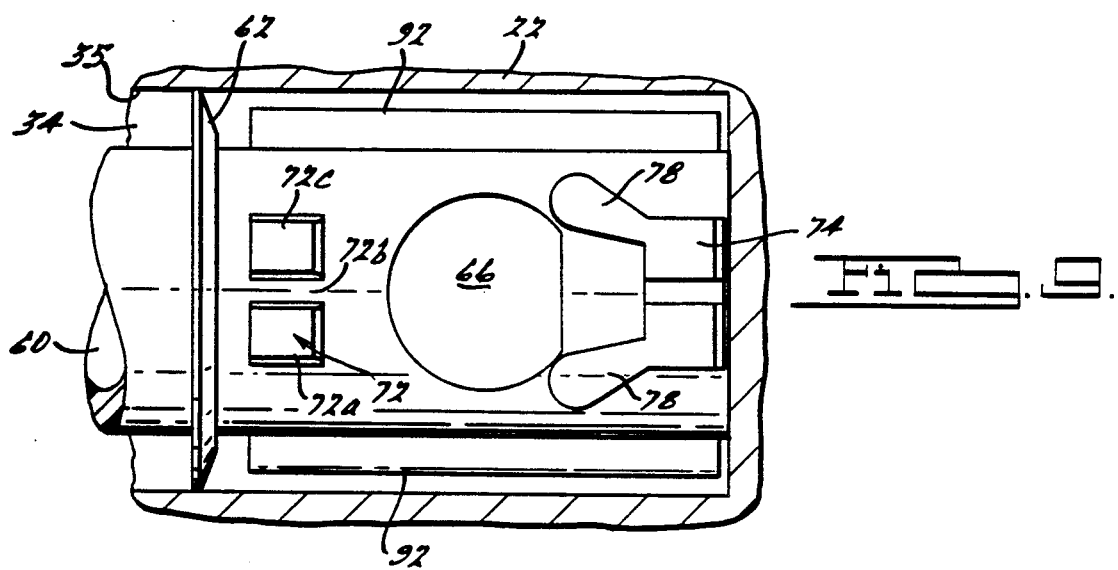
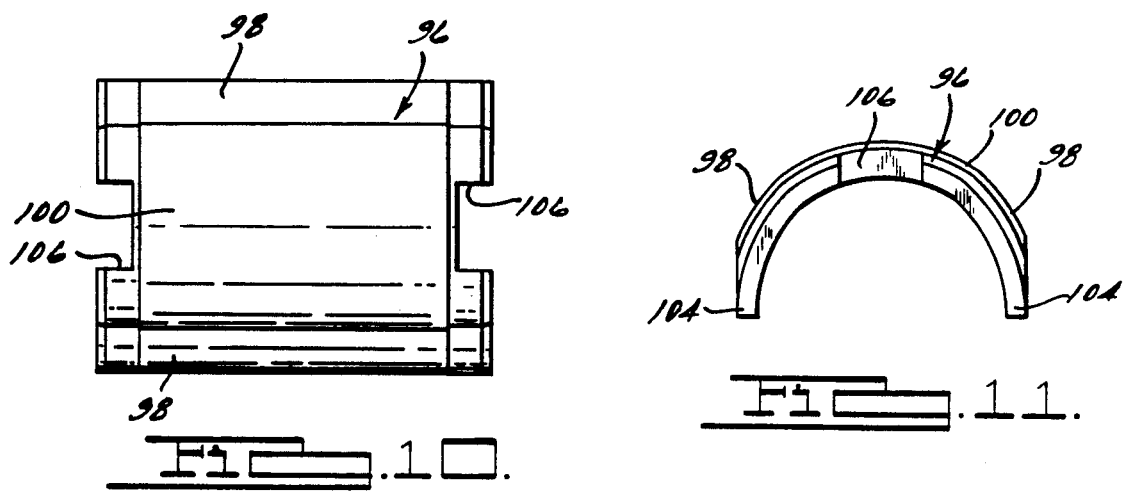

SHOWER DIVERTER VALVE

TECHNICAL FIELD

This invention relates to diverter valves and more particularly to diverter valves for directing water either to a tub spout or showerhead.

BACKGROUND F THE INVENTION

Diverter valves are commonly placed either in a tub spout or in a separate housing that is connected to a single handle valve or is interposed between hot and cold water valves above the tub spout.

Diverter valves are constructed such that they can seal off the conduit leading to the tub spout and force water to pass up through the shower riser and out through the showerhead. Some diverter valves are made to also positively seal the shower riser when water is directed to the tub spout. However, most of these designs either do not function properly allowing leakage or create added noise due to the water passing through the diverter housing from the inlet supply lines to either the shower riser or tub spout.

Some diverters are made such that they do not positively block the shower riser. An aspirator housing is mounted at the lower end of the shower riser to prevent water to rise to the showerhead. However, aspirators can either be noisy or not function properly and allow for leakage through the showerhead.

What is needed is a diverter valve assembly which is reliable and properly seals either the tub spout conduit or shower riser and does not provide additional noise due to the water flow therethrough.

SUMMARY OF THE INVENTION

In accordance with one aspect of the invention, a diverter valve assembly includes a housing having a cylindrical bore defined by a side wall thereabout. Two inlets are circumferentially spaced about the bore and extend through the side wall at first axial position and first and second outlets are circumferentially spaced about the bore at a second axial position spaced from the two inlets.

A rotatable valve member is mounted in the bore for rotating about the longitudinal axis of said bore. The rotatable valve member has a central passage therethrough with two inlets in fluid communication with the two inlets of the housing. The rotatable member has a seal member axially aligned with the outlets of the bore to selectively seal one of the first and second outlets Preferably, the rotatable valve member has an outlet circumferentially spaced from the sealing member and is selectively alignable with the other of the first and second outlets. The outlet in the rotatable valve member is in fluid communication via the central passage with the inlets in the rotatable member such that fluid passes from the inlets in the housing, through the inlets in the rotatable member, through the central passage, through the outlet of the rotatable member, and through the other of the first or second outlet of the housing.

The inlets in the housing are axially spaced between the inlets and the collar in the rotatable member such that the rotatable valve member functions as a baffle for water flowing in from the housing inlets. The housing and the rotatable valve member form an annular chamber upstream from the collar which fluidly connects the inlets of the housing with the inlets of the rotatable member. It is desirable that the inlets of the valve member are normally angularly positioned 90° from each of the inlets of the housing. In addition, it is preferable that the inlets in the housing are angularly displaced 90° from each of the outlets in the housing. The rotatable member also includes a circumferential collar which is axially spaced between the inlets and outlets of the bore for sealing the rotatable member against the bore to assure that most fluid passes through the inlets in the rotatable valve member and therethrough to assure that the valve member acts as a baffle to minimize noise due to water flow.

The seal member is desirably an elastomeric pad that has a semi-oblong arcuate free shape. The contour of the pad can be rendered by a central section of one radius and two side sections of larger radius with the centers of the radii displaced from each other. The central section is positioned on a tubular outlet section of the rotatable valve member such that there is an interference fit between the seal and the bore in the housing. Preferably the outlet section of the rotatable member is also elongated in cross-section to an oblong or elliptical like shape. For manufacturing ease, cross-sectional contour of the rotatable outlet section can be defined by a pair of radii opposed to each other, two radii opposed to each other, and a pair of inner and outer opposed radii that connect the aforementioned radii. The outer contour in cross-section is similarly manufactured with two pair of radii opposing each other. The outer radius of the tubular outlet section that seats the seal and the inner radius of the seal central section are different such that a gap is formed between the two when the seal is in a free state seated on the valve member. The gap is closed when the seal is flexed to form an interference with the housing.

Preferably the housing is machined from bar stock and the inlets in the housing are drilled. The bore in the housing can be stepped such that only the outlet section is reamed to a fine finish. The inlets and outlets having step shoulders for abutting a pipe received therein. The rotatable valve member has a stem section, a tubular inlet section, and a tubular outlet section axially spaced from each other. The tubular outlet section is flexible and seats the flexible seal pad. The tubular outlet section has two outward flanges with grooves therein which are positioned and sized to receive opposite side edges of the seal. The outlet section further has two lugs that are keyed with the seal to prevent axial movement of the seal with respect to the stem. Positioned radially opposite the seal on the outlet section are two other lugs that are sized to abut the side wall of the bore to provide the interference fit of the valve member and seal into the housing.

In this fashion, a diverter valve is provided without introducing excess torque so that the stem or valve member can be easily rotated between the two alternate positions that either block the tub spout outlet or block the showerhead outlet. In addition, the inlets and outlets are arranged to provide a baffle and minimize noise created by the water flowing through the diverter valve housing and valve member.

BRIEF DESCRIPTION OF THE DRAWINGS

Reference now is made to the accompanying drawings in which

FIG. 1 is a perspective view of a showerhead and tub spout assembly incorporating the diverter valve assembly according to the invention;

FIG. 2 is a side elevational view of the diverter valve housing shown in FIG. 1;

FIG. 3 is a side elevational and partially segmented view of the diverter valve assembly;

FIG. 4 is a cross-sectional view of the rotatable valve member shown in FIG. 3;

FIG. 5 is a fragmentary cross sectional view taken along the lines 5—5 shown in FIG. 3;

FIG. 6 is a view similar to FIG. 5 of the valve member and seal member in the free state outside of the valve housing bore;

FIG. 7 is a view similar to FIG. 3 showing the valve member rotated 180°;

FIG. 8 is a fragmentary, cross-sectional view taken along the lines 8—8 shown in FIG. 3;

FIG. 9 is a fragmentary, cross-sectional view taken along the lines 9—9 shown in FIG. 7;

FIG. 10 is a top plan view of the seal member; and

FIG. 11 is an end view of the seal member shown in FIG. 10.

DETAILED DESCRIPTION OF THE PREFERRED EMBODIMENT

As shown in FIG. 1, a showerhead 10 and tub spout 12 are mounted to conduits 14 and 16 that are often mounted behind a tile wall or a plastic wall that forms a shower/tub enclosure. The conduits 14 and 16 are mounted to outlets 18 and 20 of a diverter housing 22. The housing 22 has hot and cold water supply conduits 24 and 26 mounted at its two inlets 23 and 25. Supply conduits 24 and 26 lead to hot and cold water valve members (not shown). A diverter valve handle 28 is mounted at the front of housing 22.

Referring now to FIG. 2, the housing 22 is made from machined brass, commonly referred to as bar stock, that has outlets 18 and 20 drilled therein and threaded. Outlets 18 and 20 each have a shoulder 30 and 32 that prevents the pipe from being overly threaded into the housing 22. A central stepped bore 34 in the housing 22 extends to the front thereof circumscribed by side wall 35. The bore section axially coexistent with outlets 18 and 20 is reamed to a fine finish. An exterior threaded section 36 is sized to threadably receive a nut 38. The nut 38 secures a handle stop member 40 which has a central aperture 42 and seats two O-rings 44 and 45 which prevent leakage from the housing 22. The step member 40 abuts a washer 41.

A rotatable valve member 46 extends into the bore 34. Valve member 46 has a stem section 48 that has a central aperture 50 to receive a thread cutting screw (not shown) that mounts the valve handle 28. The stem section 48 has a flat 49 to form a D-shaped cross-section to non-rotatably engage valve handle 28 in a conventional fashion. Integral with the stem section 48 is a seating collar 54. Axially beyond the collar 54 is an integral tubular inlet section 52 that has two opposing inlets 56 leading to a central passage 60. A flexible baffle collar 62 circumscribes the downstream end of the tubular inlet section 52. The collar 62 is sized to form a close fit with wall 35 and central bore 34 as shown in FIG. 3.

The central passage 60 axially extends through an integral outlet section 64 that has a lateral outlet 66, open end 68 and a laterally extending slot 70. In addition, lugs 72, 74 are integrally formed on opposite axial sides of outlet 66. As shown in FIG. 9, lug 72 has a slot 72b to section the lug into two parts 72a and 72c to provide for more flexibility as discussed below. Lug 74 has two leg sections 78 which are used to guide the rotatable member 46 into the bore 34 and to prevent the member 46 from cocking so that lug 74 does not intrude into any of the outlets 18 and 20.

As more clearly shown in FIG. 5, the outlet section 64 has an elongated cross-section resembling an ellipse or oval. For manufacturing ease, the outlet section can be manufactured with two radius sections 84 and 86 having an outer radius that is smaller than the outer radius of two side radial sections 88 and 90.

The two larger radial sections 88 and 90 have axially and radially outwardly extending flanges 92 which form grooves 94. Two keys 80 and 82 are radially disposed opposite lugs 72 and 74. The keys 80 and 82 and grooves 94 seat a sealing pad 96. The sealing pad 96 is made from an elastomeric material such as Sanoprene and has an inner contour that is approximately semi-elliptical or semi-oval and can be manufactured from three integrally formed arced sections with the side arced sections 98 having an internal radius and a central section 100 having an internally smaller radius. The internally smaller radius is slightly larger than the outer radius of radial section 86. The differing radius of the internal surface of the sealing pad 96 and the outer radius of section 86 of the tubular outlet section 64 provides for a gap 102 when the pad 96 is seated in the free state as shown in FIG. 6. The bore 34 at the outlets 18 and 20 is dimensioned to provide an interference fit with the sealing member 96 and the tubular outlet section 64 with its lugs 72 and 74 such that the elastomeric pad section 100 flexes into a substantially semi-circular shape against the bore side wall 35 and closes the gaps 102 as shown in FIG. 5. In addition, there is some flexing of the tubular section 64 to provide for spring bias of the elastomeric pad 96 against the bore 34 at either of the outlets 18 and 20. Elastomeric pad 96 has its edges 104 sized to fit within grooves 94 and also has notches 106 sized to receive the keys 80 and 82 to prevent axial movement of the sealing pad 96 along the tubular outlet section 64. Flanges 92 prevent rotational or angular relative movement of the sealing pad 96 with respect to the tubular outlet section 64.

As shown in FIG. 3, when the sealing pad 96 is sealing outlet 18 of the housing, outlet 66 of outlet section 64 is aligned above the outlet 20 in the housing. Inlets 23 and 25 in housing 22 are axially spaced between the inlets 56 of the rotatable valve member and the flexible flange 62. Also, the tubular inlet section 52 has an outer radius sized to provide an annular chamber 53 therebetween. When water from either one or both of conduits 24 and 26 enter into inlets 23 and 25 of the housing, water flowing through the annular chamber and through the inlets 56 passes downstream through the central passage 60 of member 46 beyond the collar 62 and flows through outlets 66 and 20.

Handle 28 mounted on stem section 48 can be rotated such that member 46 is rotated to the position shown in FIG. 7 when a shower is desired.

Slot 72b in lug 72 and extending slot 70 positioned downstream of the flexible annular collar 62 provides for resiliency of the tubular outlet section 64 such that it can flex as shown in FIG. 5 when inserted into the bores 34 of housing 22. The flexing of the outlet section 64 and the elastomeric sealing pad 96 assure adequate sealing of either the outlet 20 or 18.

The curvature of the side section 98 provides that substantially other side sections 98 are spaced from the bore wall. The spacing of sections 98, resilient flexing of outlet section 64, and the elastomeric flexure of pad 96 also assure that the torque required to turn the valve member 46 is not undesirably high.

It should also be noted that in addition to the inlets 23 and 25 being axially displaced from inlets 56 as shown in FIGS. 3 and 7, they are radially positioned 90° with respect to each other such that the water is baffled within the annular chamber 53 before it flows into the inlets 56. The baffling of the water assures that the housing 22 and diverter valve assembly does not provide for undesirable noise which is common in many other diverter valve designs. Furthermore, the tubular outlet section 64 does not take a permanent compression but retains its resiliency to provide for a long durable diverter valve.

Variations and modifications of the present invention are possible without departing from the scope and spirit as defined in the appended claims.

The embodiment in which an exclusive property or privilege is claimed is defined as follows:

1. A diverter valve assembly characterized by:
   a housing having a cylindrical bore with a side wall and two inlets circumferentially spaced about said bore through said side wall at a first axial position in said bore, and a first and second outlet circumferentially spaced about said bore through said side wall at a second axial position in said bore;
   a rotatable member being mounted in said bore for rotation about the axis of said bore;
   said rotatable member having a central passage therethrough and two inlets in fluid communication with said two inlets of said housing;
   said rotatable member having a circumferential collar axially spaced between said inlets and outlets of said bore for sealing said rotatable member against said bore side wall;
   said rotatable member having a sealing means axially aligned with said outlets and rotatable to selectively seal one of said first and second outlets;
   said rotatable member having an outlet at the downstream end of said central passage circumferentially spaced from said seal means and selectively alignable with the other of said first and second outlet;
   said outlet in said rotatable member being in fluid communication via said central passage with said inlets of said rotatable member such that fluid passes from said inlets in said housing through said inlets in said rotatable member through said central passage and is discharged through said outlet in said rotatable member and the other of said first or second outlet in said housing;
   said inlets in said housing being axially spaced between said inlets and said collar of said rotatable member;
   said housing and said rotatable member forming an annular chamber which fluidly connect said inlets of said housing with said inlets of said rotatable member;
   said inlets of said rotatable member being normally radially positioned approximately 90° from each of said inlets of said housing; and
   said sealing means including an elastomeric pad keyed to rotate with said rotatable member and biased against said side wall of said bore by being flexed into a semi-circular contour shape when inserted in said bore.

2. A diverter valve assembly as defined in claim 1 further characterized by:
   said two inlets in said housing being circumferentially spaced about 180° from each other;
   said two outlets in said housing being circumferentially spaced about 180° from each other;
   said two inlets being radially positioned 90° about said bore from said outlets.

3. A diverter valve assembly as defined in claim 1 further characterized by:
   said housing being machined from stock;
   said inlets in said housing being drilled therein;
   said outlets in said housing being drilled therein; and
   said inlets and said outlets having stepped shoulders for abutting a pipe received therein.

4. A diverter valve assembly as defined in claim 1 further characterized by:
   a laterally extending slot being axially interposed between said collar and said outlet on said rotatable member.

5. A diverter valve assembly comprising:
   a housing having at least one inlet for supplying fluid to said housing, a first and second outlet for the selective discharge of said fluid, and a central bore in fluid communication with said at least one inlet and said two outlets;
   said two outlets of said housing being circumferentially spaced about said bore and being axially spaced from said at least one inlet;
   a valve member being rotatably mounted in said bore for rotation about a longitudinal axis of said bore;
   said valve member having a central axially extending passage therethrough and at least one laterally extending inlet in fluid communication with said passage and with said at least one inlet of said housing;
   said valve member having means to form an interference fit with aid bore and having a sealing portion keyed to rotate with said valve member comprised of elastomeric material with an arcuate curvature and a semi-oval contour shape in its free state that is biased against the bore by said interference fit to selectively seal against one of said first and second outlets of said housing;
   said valve member having one laterally extending outlet axially spaced downstream of said inlet and in fluid communication with said central passage;
   said outlet in said valve member being circumferentially spaced from said sealing portion and selectively alignable with the other of said first and second outlet of said housing;
   said outlet in said valve member being in fluid communication via said central passage with said at least one inlet of said valve member such that fluid passes from said at least one inlet in said housing through said at least one inlet in said valve member into said central passage and is discharged through said outlet in said valve member and the other of said first or second outlet in said housing.

6. A diverter valve assembly as defined in claim 5 further comprising:
   said valve member having a seating section to seat said sealing portion;
   said seating section having a radius contour that is less than the radius contour of an inner surface of said sealing portion to provide gaps therebetween when said sealing portion is in a free state which allows the sealing portion to flex when fitted within the bore of said housing thereby substantially closing said gaps.

7. A rotatable diverter valve member adapted for rotatable mounting in the bore of a diverter valve housing comprising:

a stem section;

a tubular inlet section having at least one inlet port extending laterally therethrough and a central passage extending longitudinally therethrough;

a flexible collar mounted on and circumscribing said tubular inlet section axially spaced downstream of said at least one inlet port and sized to form a seal against said bore of said diverter valve housing;

an outlet section having an oval cross-section being axially spaced downstream from said tubular inlet section;

said outlet section having one outlet port extending laterally therethrough and a central passage longitudinally extending therethrough and in communication with said central passage of said inlet section;

a contoured sealing pad element mounted on said outlet section circumferentially spaced from said outlet port;

said sealing pad element comprised of elastomeric material and having a substantially semi-circular contour shape when flexed against the bore of said valve housing;

means on said outlet section for receiving said sealing pad element against circumferential and axial movement; and means on said outlet section for said outlet section to form an interference fit with said bore.

8. A rotatable diverter valve comprising:

a stem section;

a tubular inlet section axially alignable with at least one inlet in a diverter valve housing;

said tubular inlet section having a central passage extending longitudinally therethrough and at least one laterally extending inlet port therein in communication with said central passage;

a tubular outlet section axially spaced downstream from said inlet section and axially alignable with a pair of outlets in a diverter valve housing;

said tubular outlet section having a central passage extending longitudinally therethrough in fluid communication with said central passage of said inlet section;

said tubular outlet section having one laterally extending outlet port therein in communication with said central passage thereof rotatably alignable with one of said pair of outlets in said diverter valve housing;

an elastomeric sealing pad having an elongated free state and a semi-circular contour shape when flexed on said tubular outlet section, said sealing pad being flexible to be fitted in a cylindrical bore in said diverter valve housing and to sealingly abut against a side wall thereof;

said sealing pad being circumferentially spaced from said outlet port;

said tubular outlet section having means for receiving said sealing pad against circumferential movement and means for receiving said sealing pad against axial movement on said tubular outlet section; and said tubular outlet section having means to form an interference fit in said cylindrical bore between said sealing pad and a side wall of said bore.

9. A rotatable diverter valve as defined in claim 8 wherein said means for receiving said pad against circumferential movement comprise two circumferentially spaced flanges that define longitudinal grooves which are sized to receive opposite side edges of said sealing pad.

10. A rotatable diverter valve as defined in claim 9 wherein said means for receiving said pad against axial movement comprise a first pair of radially protruding lugs circumferentially positioned between said flanges and being axially spaced to receive the sealing pad against axial movement on the tubular outlet section.

11. A rotatable diverter valve as defined in claim 10 wherein said means to form an interference fit in said cylindrical bore comprise a second pair of protruding lugs axially positioned on each side of said outlet;

said second pair of lugs extending radially outward to form an interference fit in said cylindrical bore to bias said sealing pad against a side wall thereof.

12. A rotatable diverter valve as defined in claim 11 further characterized by:

one of said second pair of lugs having two flared leg sections for helping guide said stem through said cylindrical bore and preventing said lug from extending into an inlet or outlet of said housing.

13. A rotatable diverter valve as defined in claim 8 further comprising:

an annular collar being axially spaced between said inlet section and said tubular outlet section and sized to form a seal against said cylindrical bore of said diverter valve housing.

14. A rotatable diverter valve as defined in claim 12 further characterized by:

a lateral slot being interposed between said annular collar and said tubular outlet section.

15. A rotatable diverter valve as defined in claim 8 further comprising:

said tubular outlet section having a section with a radius smaller than the internal radius of a section of said sealing pad when in the free state to form a gap between the sealing pad and said tubular outlet section which allows the sealing pad to flex when fitted within the housing thereby substantially closing said gap.

* * * * *